July 22, 1969  D. STUBBINS ET AL  3,456,775

BATCHING APPARATUS

Filed Sept. 25, 1967

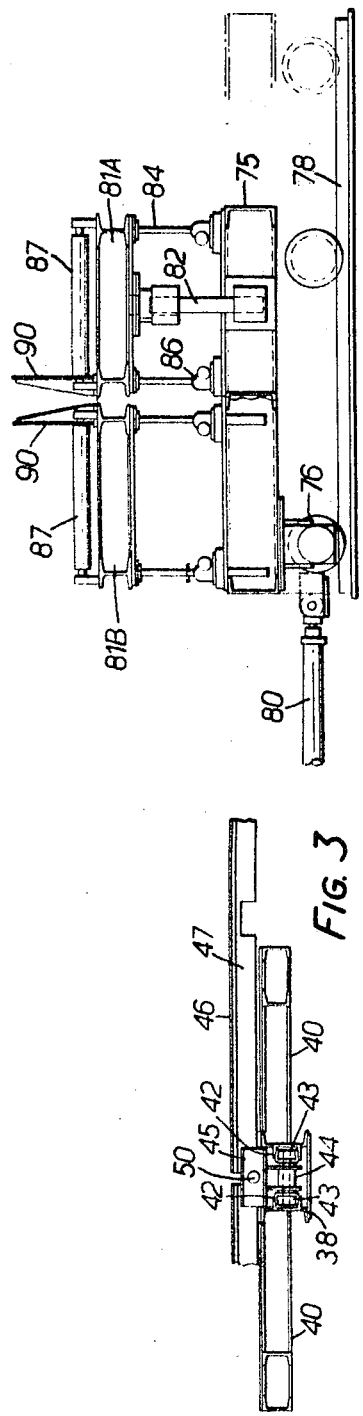
FIG. 3
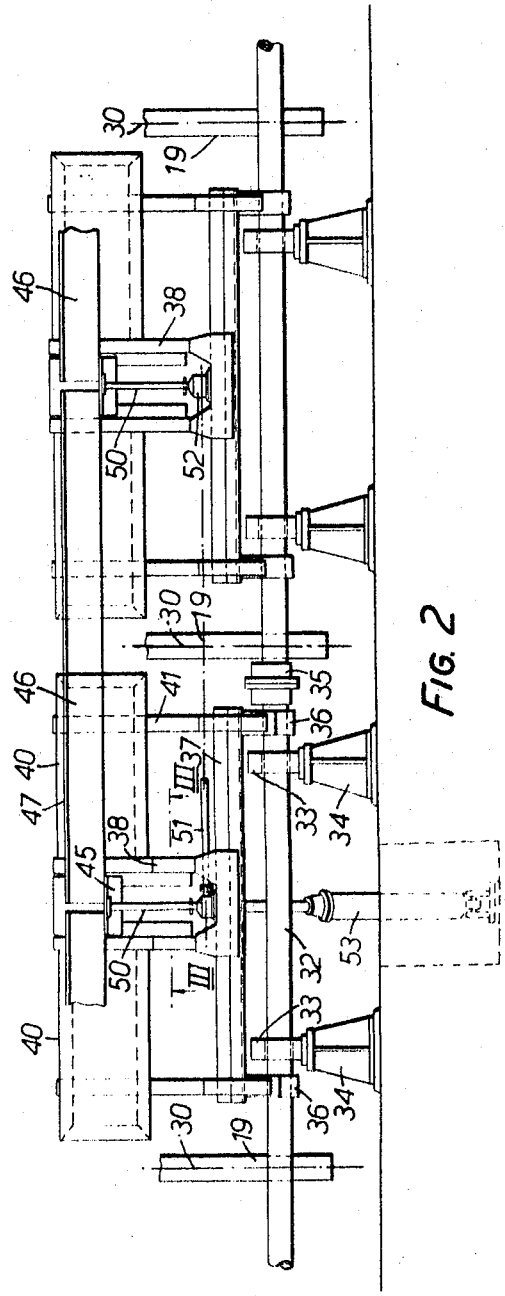
FIG. 6
FIG. 2

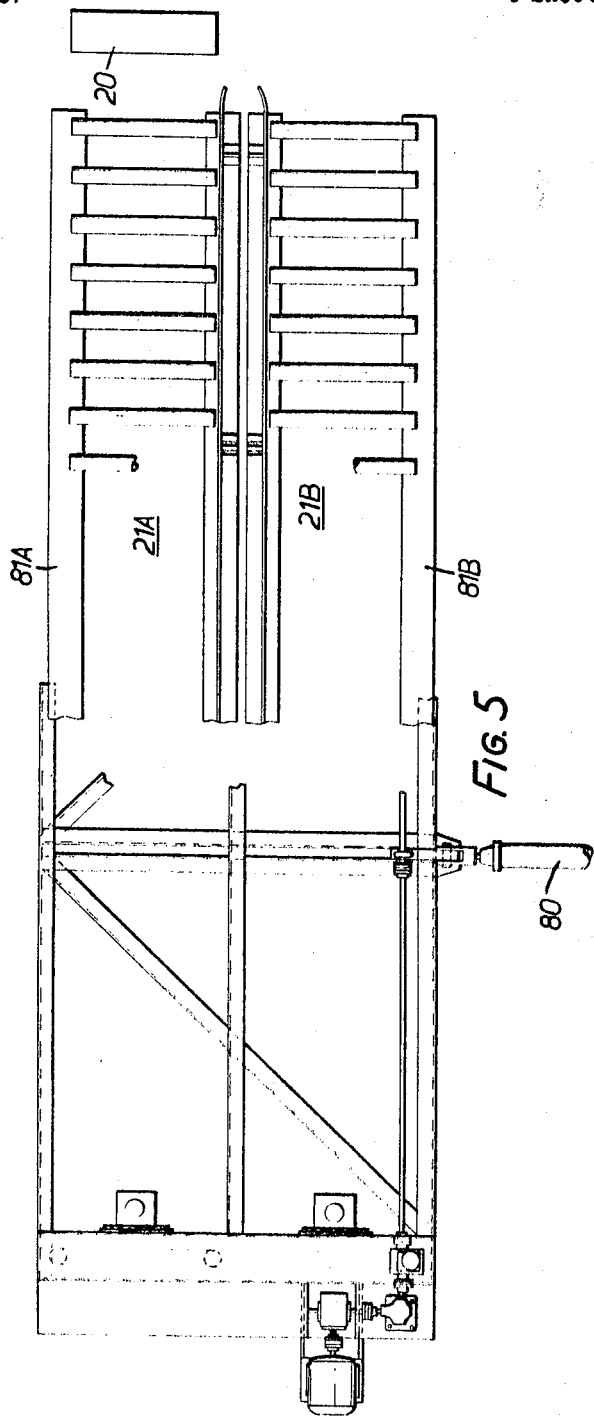

United States Patent Office 3,456,775
Patented July 22, 1969

---

3,456,775
BATCHING APPARATUS
Derek Stubbins, Sheffield, and Brian Nunns, Doncaster, England, assignors to Davy and United Engineering Company Limited, Yorkshire, England
Filed Sept. 25, 1967, Ser. No. 670,339
Claims priority, application Great Britain, Sept. 23, 1966, 42,536/66
Int. Cl. B65g 47/26, 57/00, 59/00
U.S. Cl. 198—34                                9 Claims

ABSTRACT OF THE DISCLOSURE

Apparatus for receiving metal strips and forming them into batches or packs comprising a pivoted arm device having an operative position inclined to the horizontal in which position the strips are received from a guide system and supported on the arm device, a stop member carried by the arm device and movable along it forms the strips into the batch or pack and when the pack has been so formed the arm device is lowered and the pack removed from the device by a conveyor system.

---

This invention relates to batching apparatus and is particularly, but not exclusively, concerned with apparatus for forming metal strips into batches or packs, preparatory to pack annealing. In pack anealing, hot strips from the following mill are formed into packs which are allowed to cool slowly to a predetermined lower temperature, prior to break up to individual strips again. The present invention is applicable to apparatus for forming packs of hot strips for this purpose.

In accordance with one aspect of the present invention, apparatus for forming strips into a batch or pack comprises a pivoted arm device for supporting the strips and having an operative position inclined to the horizontal, a stop member carried by, and upstanding from, the device and movable along the arm, a guide system for guiding strips onto the device, and a conveyor system for removing a pack of strips from the device when the device is in a lowered delivery position; the apparatus is so arranged that the first strip of a pack is received against the stop member which is then retracted down the arm device to accommodate subsequent strips, and, when a pack has thus been formed, the arm device is lowered to enable the pack to be removed by the conveyor system.

Preferably, the guide system includes a guide member which is adjustable to take up a position separated from the support arm by a distance only slightly greater than the width of the strips. The guide member is adjusted prior to the feed of strips to the appropriate separation from the pivoted arm device in the latter's operative position. The strips slide over the surface of the guide member and, on falling from the guide member onto the arm device, are received by the stop member or the previous strip deposited on the arm device. Having the separation between the guide member and the arm device only slightly greater than the width of the strips minimises the danger of the strip falling improperly onto the arm device and fouling the formation of a pack.

The conveyor system is preferably arranged to convey packs up a path inclined to the horizontal and over an apex at the end of the system, so that the pack is delivered from the system as individual strips. Thus, the conveyor system may include carrying plates on which the packs are carried towards the apex, and a further guideway in the form of a slideway inclined downwardly from the apex. Thus, when the pack is moved slowly over the apex, the strips forming the pack slide individually down the slideway.

Figure 1:
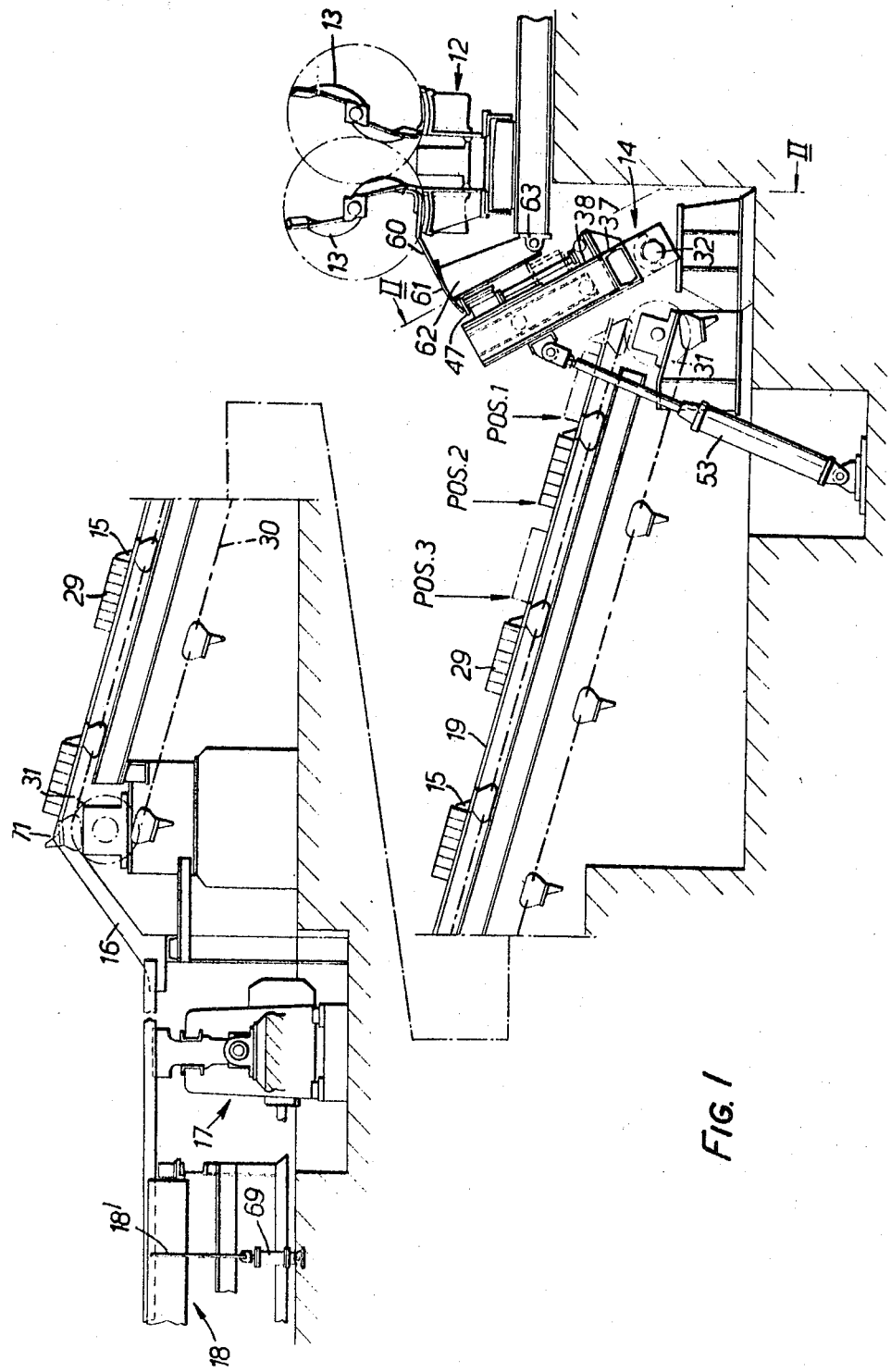
Figure 4:
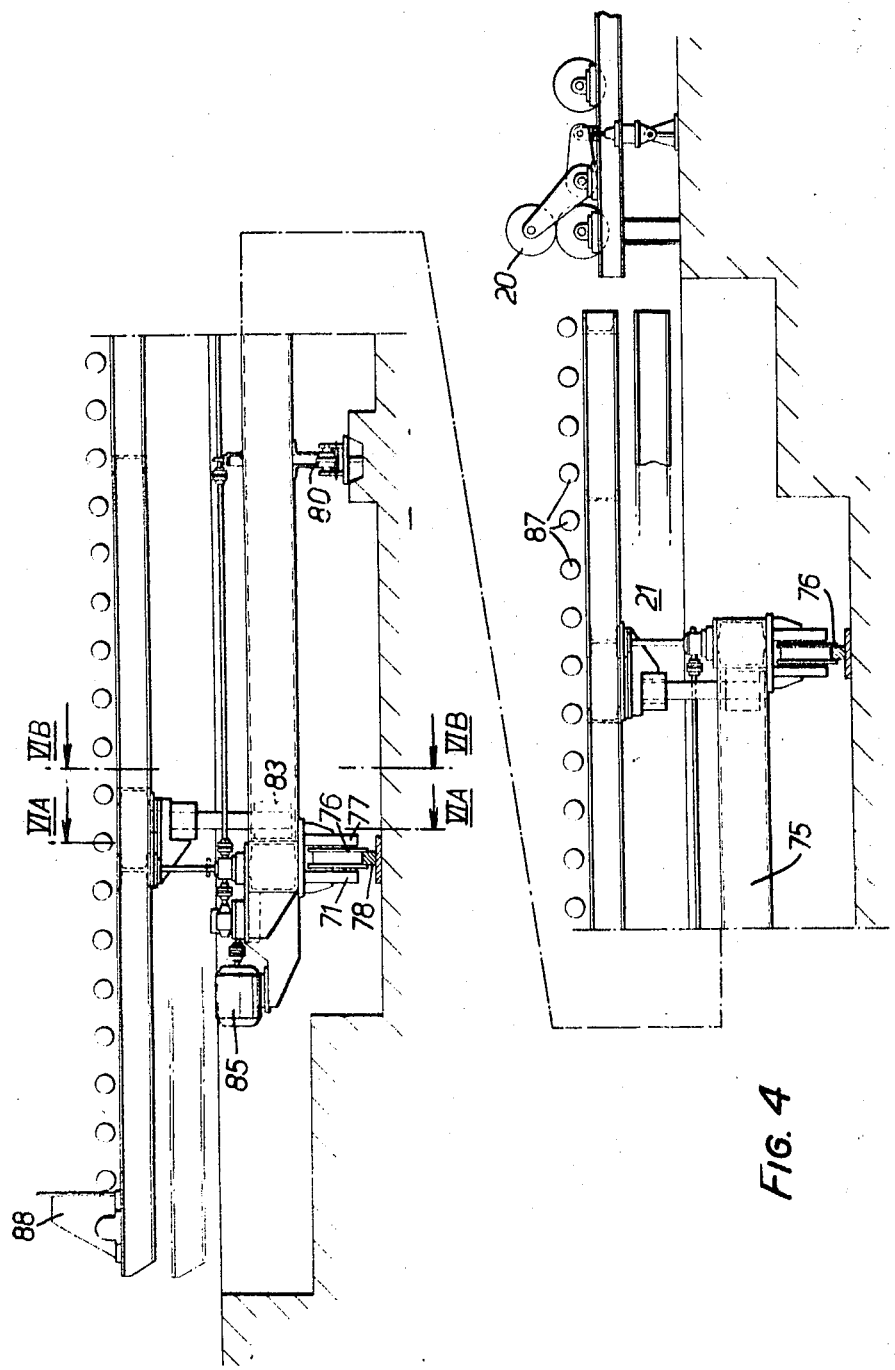

The invention will be more readily understood by way of example from the following description of a conveyor line for cooling and stacking metallic strips in discrete lengths, reference being made to the accompanying drawings, in which FIGURE 1 is a side view of stacking apparatus and a cooling conveyor,
FIGURE 2 is a section on the line II—II of FIGURE 1,
FIGURE 3 is a section on the line III—III of FIGURE 2,
FIGURE 4 is a side view of a stacking table,
FIGURE 5 is a plan view of the same table, and
FIGURE 6 is a sectional view, the left-hand and right-hand halves of the figure being sections on the lines VIA—VIA and VIB—VIB, respectively, of FIGURE 4.

The apparatus specifically illustrated in the drawings is intended to anneal and stack flats of spring steel in the form of strips coming off a rolling mill at high temperature. It will, however, be appreciated that the apparatus is applicable to other materials. Generally, the flats are conveyed from the rolling mill by a roller table indicated at 12 in FIGURE 1 and are swept off table 12 by arms 13 onto a pivoted support arm device shown generally at 14, in order to form a pack of the flats. When such a pack has been formed, the device 14 is pivoted downwardly so that the pack is picked up by the dogs 15 of a conveyor system, deposited on to carrying plates 19, and moved upwardly by the plates 19 and dogs 15. The packs are carried in cyclic movements until at the end of the conveyor the flats of the pack are caused to slide individually down a slideway 16 to a shuffle bar system indicated generally at 17, which feeds a roller table 18.

The roller table 18 (FIGURE 1) is provided with centrally disappearing stops 18' and central division plates (not shown), which latter divide the roller table 18 into two parallel sections. The gangs of flats, separated by the division plates, are formed by operation of the disappearing stops on the roller table 18, which conveys the flats to a cross-shear (not shown), which shears flats in the two sections simultaneously. The sheared flats are passed through driven pinch rolls 20 (FIGURE 4) and thence to a stacking table 21. This stacking table is formed in two sections 21A, 21B, each capable of taking the two gangs of flats side by side. Each section 21 of the stacking table can be lowered after the arrival of each set of flats, so that stacks of flats are formed on the section. When one section has received its full quota of flats, the stacking table 21 is moved bodily transversely of the pinch rolls in order to present the other, previously unused, section 21. Thus, the two sections of the stacking table are used alternately, the stacks formed on one section being discharged, while stacks are being formed on the other section.

Referring now specifically to the cooling conveyor system shown in FIGURES 1-3, this conveyor consists of seven parallel continuous chains 30, of which three are shown in FIGURE 2. Each of these chains carries, at intervals along its length, a series of the dogs 15, the dogs on the various chains being aligned. The chains pass over driven sprocket wheels 31, as indicated in FIGURE 1, the path of the chains is inclined to the horizontal, the packs of flats indicated at 29 being conveyed upwardly from the lowest point of the carry plates 19 onto which the packs are deposited, to the highest point of the plates 19, where the flats are individually discharged onto the slideway 16.

The arm device 14 is formed in six sections, each section lying between an adjacent pair of the conveyor chains 30. The various sections are similar, two being shown in FIGURE 2 and, for this reason, only one such section will now be described. This section is carried on a shaft 32, which itself is supported in bearings 33 secured on pedestals 34; the shafts 32 of the various sections are connected together by joints 35. Secured to the shaft 32 are a pair of arms 36 which carry a cross beam 37, to which is centrally secured a box-section arm 38, carrying in turn transverse members 40, which are additionally supported from the beam 37 by fingers 41.

The arms 38 carry a pair of lengthwise rails 42, in which run wheels 43 carried on a shaft 44, to which is secured a block 45. A support member 46 is secured between the blocks 45 of adjacent sections of the device 14, this member 46 having a stop member in the form of a support plate 47 at right angles to the length of the arm 38. The support members 46 can be driven along the length of the arms 38 by screw jacks 50, which are attached to the blocks 45 and which are driven by a shaft 51, through the screw jacks gear boxes 52.

The arms 38 can be rotated about the axis of the shafts 32 by hydraulic rams 53, which are pivoted at their upper ends to the underface of the arms, as shown in FIGURE 1.

The flats, which are swept off the roller table 12 by the arms 13, are guided by a fixed guide plate 60 and a movable guide plate 61, the latter being carried on arms 62 which are pivoted on pivot shaft 63.

For the formation of a pack of flats, the device 14 is placed into the position indicated in FIGURE 1 and the guide plate 61 is adjusted so that the gap formed between the lower extremity of the plate and the arms 38 is only slightly greater than the width of the hot flats to be relivered. Delivery of the flats is then commenced, the individual flats sliding down the guide plates 60, 61 and the first flat coming to rest with its surface contiguous with the support plates 47 of the members 46 which are initially at their upper extremities, adjacent the plate 61. After the arrival of each flat, the shaft 51 is driven to lower the support plates 47 by the thickness of a flat, so that each successive flat slides down the face of the preceding flat and, with time, forms a pack. When this pack has been thus formed, the hydraulic rams 53 are operated to turn the arms 38 about the shafts 32 in an anti-clockwise direction as seen in FIGURE 1 until those arms lie parallel to the chains 30 of the cooling conveyor. The carry plates 19 are attached to chain segments 30. The device 14 is lowered until only a small clearance is left between the packs and the plates 19. The pack is removed from the device by dogs 15 by the movement of the conveyor sliding the pack from the arms 14 onto the carry plates 19. When the pack has reached the "POSITION 2" shown in FIGURE 1, the rams 53 are actuated to return the device 14 to the receiving position shown in FIGURE 1, so that the formation of the next pack can be commenced.

As shown in FIGURE 1, the slide 16 has an apex 71 lying over the upper sprocket wheel 31. As the flats are to be allowed to cool in a controlled manner, during their ascent of the conveyor, in order that they may be pack annealed, the cooling conveyor is intermittently operated with the result that each pack 39 takes a substantial time to traverse the length of the conveyor. Thus, each pack, on being deposited in "POSITION 1" is moved to "POSITION 2" in 5 seconds. The conveyor then is stopped for 6 minutes, after which it is moved to "POSITION 3" at a creep speed of 2 feet in 2 minutes. In "POSITION 3" there is another delay of 55 seconds, during which the next pack is deposited in "POSITION 1"; the 9 minute cycle is then repeated, each pack remaining on the conveyor for a minimum time of 42 minutes in this particular example. During the part of the cycle at which the conveyor is moving at creep speed, the uppermost pack on the conveyor is slowly moved over the apex 71, so that the flats constituting that pack slide individually down the slideway 16 onto the shuffle bar system 17.

The direction of movement along the roller table 18 is normal to the shuffle bar system 17 and, as before mentioned the disappearing stops 18', of which one only is shown in FIGURE 1, are located between the rollers of the roller table 18, opposite the shuffle bar system 17 so that, when the stops 18' are raised by the hydraulic cylinders 69, it causes flats to be deposited on the righthand half of the roller table as viewed in FIGURE 1 whereas, when the stop is lowered, the flat is moved to the left-hand half. With the roller table stationary and the stops 18' lowered, the operator allows flats to be moved by the shuffle bar system to fill the left-hand half; thus, if each section of the roller table is 18" wide, four 4" wide flats are directed to the left-hand half. When the stops 18' are raised and in similar manner the right-hand half is similarly filled with flats. The roller table drive is started to carry the two separate gangs of flats, to formed, simultaneously to the shear, the separation of the gangs being maintained by the division plates. All the flats in both gangs are simultaneously sheared by the shears which extend across the full width of the table.

Turning now to FIGURES 4 to 6 and a detailed consideration of the stacking table there shown, the table 21 has a chassis 75 mounted on grooved wheels 76, which are carried in bearings 77 and which run on rails 78. The stacking table can be driven along the rails 78, through a distance equal to half the width of the table, by a double-acting hydraulic ram 80 coupled to the chassis 75. Mounted side by side on the chassis 75 are two platforms 81A and 81B for the two sections 21A, 21B of the roller table. Each of the platforms 81A and 81B is vertically movable on the chassis 75, being guided vertically by a pair of pins 82 slidably arranged in blocks 83 on the chassis. Vertical movement of each platform 81A and 81B is effected by four screw jacks 84, arranged at the corners of the platform and driven in common by an electric motor 85 carried by the chassis 75, there is a separate motor 85 and drive for each of the two platforms 81A and 81B.

Each platform 81A and 81B carries a set of undriven rollers 87, which constitute the section of the roller table. In addition, each platform 81A and 81B carries at the end distant from the pinch rolls 20, a stop 88, which is adjustable lengthwise of the table. Spacer plates 90 project upwardly from the platforms to ensure that flats directed onto one section of the table do not find their way onto the other section.

Although not shown in FIGURES 4 to 6, each section 21 of the stacking table may have two lifting frames set into the table and arranged to form apron plates between the idler rollers 87. The lifting frames enable the stacks of flats to be removed, without slinging of the stacks themselves.

The operation of the stacking table will be readily apparent from the previous description. The two separated gangs of flats from the shear are driven onto one section 21 of the table by the pinch rolls 20, the flats moving over the idler rollers 87 until brought to rest by the appropriate stop 88. Each time a set of flats is delivered, the appropriate motor 85 is operated to lower the section of the table by the thickness of the flats. In this way, two stacks of flats are formed on the section 21 in use; when the stacks have reached the correct height, further delivery of flats is temporarily ceased and the hydraulic ram 80 is operated to bring the other section of the table into alignment with the pinch rolls 20; delivery of the flats to the new section is then commenced. While the new stacks are forming, those completed on the other section 21 are removed, using the lifting frames, if provided, and otherwise by passing cables round the individual stacks and lifting with a crane. The two sections of the stacking table are thus used alternately, the completed stacks being removed from one, while stacks are being formed on the other.

The formation of two gangs of flats by the disappearing stop mentioned above, and thus the two separate stacks of flats on each section of the stacking table, permits the easy removal of the stacks using a crane of similar capacity than would be needed if a single gang and single stack were formed.

We claim:

1. Apparatus for forming strips into a batch or pack comprising a pivoted arm device for supporting the strips and having an operative position inclined to the horizontal, a stop member carried by, and upstanding from, the device and movable along the device, a guide system for guiding strips onto the device, and a conveyor system for removing a pack of strips from the device when the device is in a lowered delivery position; the apparatus being so arranged that the first strip of a pack is received against the stop member which is then retracted down the arm device to accommodate subsequent strips, and, when a pack has been formed, the device is lowered to enable the pack to be removed by the conveyor system.

2. Apparatus as claimed in claim 1 in which the arm device is raised and lowered between its operative and delivery positions by hydraulically operated means.

3. Apparatus as claimed in claim 1 in which the guide system includes a guide member which is adjustable to take up a position separated from the support device by a distance only slightly greater than the width of the strips.

4. Apparatus as claimed in claim 3 in which the guide member is in the form of a plate mounted at one end of a pivoted arm to enable the guide plate to be moved relative to the support device.

5. Apparatus as claimed in claim 1 in which the conveyor system is arranged to convey packs up a path inclined to the horizontal and over an apex at the end of the system so that the pack is delivered from the system as individual strips.

6. Apparatus as claimed in claim 5 in which the conveyor system comprises a plurality of spaced continuous chains, a plurality of carry plates each supported by two adjacent chains and a series of dogs on each chain with the chains arranged mutually parallel and the dogs on each chain aligned with those on the other chains.

7. Apparatus as claimed in claim 6 in which the arm device is in a plurality of sections with the sections arranged mutually parallel and positioned between adjacent conveyor chains.

8. Apparatus as claimed in claim 1 in which the stop member is in the form of an elongate support plate extending at right angles to the length of the pivoted arm device and mounted on wheeled blocks which are movable along the length of the arm device.

9. Apparatus as claimed in claim 8 in which the support plate is in a plurality of parts arranged in end-to-end relation with adjacent ends of each pair of adjacent parts supported on the same wheeled block and each block movable along the length of the arm device by a separate axially extensible elongate member.

References Cited

UNITED STATES PATENTS

| 770,486 | 9/1904 | White | 198—27 X |
|---|---|---|---|
| 1,837,607 | 12/1931 | Biggert | 198—27 X |

EDWARD A. SROKA, Primary Examiner

U.S. Cl. X.R.

198—35